US006810966B1

(12) United States Patent
Bauer et al.

(10) Patent No.: US 6,810,966 B1
(45) Date of Patent: Nov. 2, 2004

(54) EXTINGUISHER

(75) Inventors: Karl Bauer, Soyen (DE); Joachim Sans, Putzbrunn (DE); Steffen Schilling, Kraiburg (DE)

(73) Assignee: Bayern-Chemie GmbH, Aschau Am Inn (DE)

( * ) Notice: Subject to any disclaimer, the term of this patent is extended or adjusted under 35 U.S.C. 154(b) by 233 days.

(21) Appl. No.: 10/031,683

(22) PCT Filed: Jul. 8, 2000

(86) PCT No.: PCT/DE00/02240

§ 371 (c)(1), (2), (4) Date: Apr. 15, 2002

(87) PCT Pub. No.: WO01/07117

PCT Pub. Date: Feb. 1, 2001

(30) Foreign Application Priority Data

Jul. 21, 1999 (DE) ........................................ 199 34 164

(51) Int. Cl.[7] ........................ A62C 37/14; A62C 35/02; A62C 35/00; F16K 17/14; F16K 17/40

(52) U.S. Cl. ............................... 169/58; 169/26; 169/5; 137/68.27

(58) Field of Search ................................ 169/58, 26, 5, 169/9, 11, 27, 28, 66, 68, 71, 72, 75, 77, 78, 56, 84; 137/68.27, 68.26, 68.25, 68.13, 910

(56) References Cited

U.S. PATENT DOCUMENTS

| | | | | | |
|---|---|---|---|---|---|
| 2,530,633 | A | * | 11/1950 | Scholz | 169/26 |
| 3,604,511 | A | * | 9/1971 | Griffith et al. | 169/28 |
| 3,762,479 | A | * | 10/1973 | Fike et al. | 169/28 |
| 5,031,701 | A | * | 7/1991 | McLelland et al. | 169/58 |
| 5,291,952 | A | * | 3/1994 | Arend | 169/71 |
| 5,609,210 | A | * | 3/1997 | Galbraith et al. | 169/26 |
| 6,178,983 | B1 | * | 1/2001 | Culliinane et al. | 137/68.26 |

FOREIGN PATENT DOCUMENTS

| | | |
|---|---|---|
| DE | 42 24 184 | 1/1994 |
| DE | 195 44 399 | 6/1997 |
| WO | 98/39064 | 9/1998 |

* cited by examiner

*Primary Examiner*—Michael Mar
*Assistant Examiner*—Darren Gorman
(74) *Attorney, Agent, or Firm*—Kenyon & Kenyon

(57) ABSTRACT

An extinguisher includes a compressed-gas generator for fighting fire and incipient explosions, and the extinguisher includes at least one rupture diaphragm having a rupture joint, in order to seal the extinguishing-agent vessel. In its center, the rupture diaphragm has a planar surface or a depression, which causes the rupture joint to simultaneously open at its entire circumference, in order for the extinguishing agent to escape in an axially symmetric manner.

3 Claims, 2 Drawing Sheets

EXTINGUISHER

FIELD OF THE INVENTION

The present invention relates to an extinguisher for fighting fire and incipient explosions, the extinguisher including at least one rupture diaphragm, which seals an extinguishing-agent vessel and has a rupture joint.

BACKGROUND INFORMATION

To fight fire and suppress incipient explosions which are caused by flour dust, coal dust, or solvent vapors, one normally uses vessels that are filled with an extinguishing agent (usually extinguishing powder) and are permanently under pressure. In an emergency, these blow the extinguishing agent through a quick-opening valve, into the space where extinguishing is required.

An extinguisher for fighting incipient explosions is described in German Published Patent Application No. 195 44 399, where a tubular extinguishing-agent vessel is sealed on the inside and outside by flat rupture diaphragms. In the interior chamber adjacent to the inner rupture diaphragm, a compressed-gas generator is provided, the generated propellant gas of which ruptures the diaphragms and then expels the extinguishing agent. This extinguisher does not often achieve good results, since the rupture diaphragms seldom burst open in the center, or in an axially symmetric manner. Instead, the diaphragms rupture at a point outside their center, which causes the expelled extinguishing agent to be dispersed in a considerably asymmetric manner. However, it is necessary to expel all of the extinguishing agent in a uniform manner, in order to attain an optimum spray pattern and, thus, success in extinguishing.

In addition, German Published Patent Application No. 42 24 184 describes an extinguisher, where the extinguishing-agent vessel is sealed on the outside by a convex rupture diaphragm, which is provided with circular and radial rupture joints. This diaphragm already opens at a pressure of 0.1 to 1.0 bar above atmospheric pressure. Connected to the extinguishing-agent vessel is a compressed-gas generator, which, in response to being triggered, mixes the extinguishing agent together with the compressed gas and sprays this mixture into the space where the extinguishing is to take place. In order for the extinguishing agent to have a rapid effect, it may be more favorable for the extinguishing agent to only be dispersed after it is expelled from the vessel. The shape of the diaphragm used also does not allow one to compensate for the change in the extinguishing-agent volume as a function of the temperature.

Other conventional extinguishers include rupture diaphragms that are spherically shaped so as to be inwardly concave in the direction of the compressed-gas generator, and are provided with a rupture joint. These rupture diaphragms bulge in response to pressure applied by the gas generator or thermally induced expansion, at some point that, generally, is not at the center of the diaphragms, but rather at an arbitrary position on the spherical diaphragm surface. The bulge extends to the other side in the form of an inversion and results in a rupture joint rupturing off-center. This causes the extinguishing agent to be discharged in a nonuniform manner.

Therefore, it is an object of the present invention to provide a rupture diaphragm for an extinguisher of the type mentioned above, so as to eliminate the above-mentioned disadvantages and cause the rupture diaphragm to burst open in the center, and thus uniformly disperse the extinguishing agent.

SUMMARY

The foregoing object is achieved by providing an extinguisher as described herein. An advantage of the rupture diaphragm according to the present invention is that the planar surface or the depression in the center of the rupture diaphragm allows the diaphragm to be easily inverted in the case of pressure being applied, without local bulging occurring. In this context, the rupture diaphragm behaves like a cup spring. In addition, the rupture diaphragm configured according to the present invention may compensate for thermal expansion of the extinguishing agent, since the planar surface or the depression in the center of the diaphragm is elastic in its movement in the axial direction.

A further advantage results from the circular shape of the planar surface in the center of the rupture diaphragm, in that a uniform load distribution is achieved in response to an applied pressure. This supports a uniform inversion of the diaphragms and prevents them from bulging on the side. The inverting procedure causes the rupture joint provided on the edge of the rupture diaphragm to weaken prior to breaking, so that the actual rupturing event occurs simultaneously on the entire circumference, and the extinguishing agent is expelled in a uniform manner.

An example embodiment of the extinguisher according to the present invention is described in detail below and is illustrated in the drawing in a schematically simplified manner.

DETAILED DESCRIPTION

Figure 1:
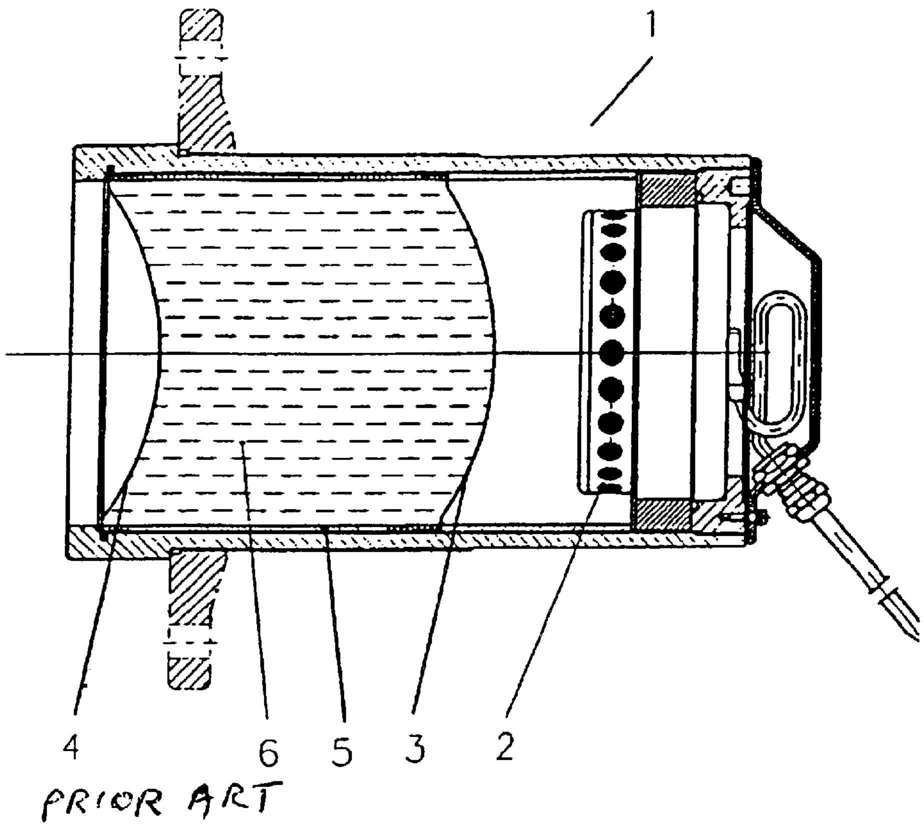
FIG. 1 schematically illustrates an extinguisher having concave diaphragms according to the related art.

Illustrated in FIG. 1 is an extinguisher 1, which is constructed in a conventional manner and contains a pyrotechnic gas generator 2. Rupture diaphragms 3 and 4, which are concave with respect to pyrotechnic gas generator 2, i.e., curved in the direction of the gas generator, seal extinguishing-agent cartridge 5 so that extinguishing agent 6 cannot escape. Rupture diaphragms 3 and 4 are spherically shaped and have rupture joints in their diaphragm surfaces. In the case of pressure being applied, such rupture diaphragms bulge at some randomly determined point or at a weak point in the material. In the case of a distinct bulge, the nearest rupture joint begins to break.

Figure 2:
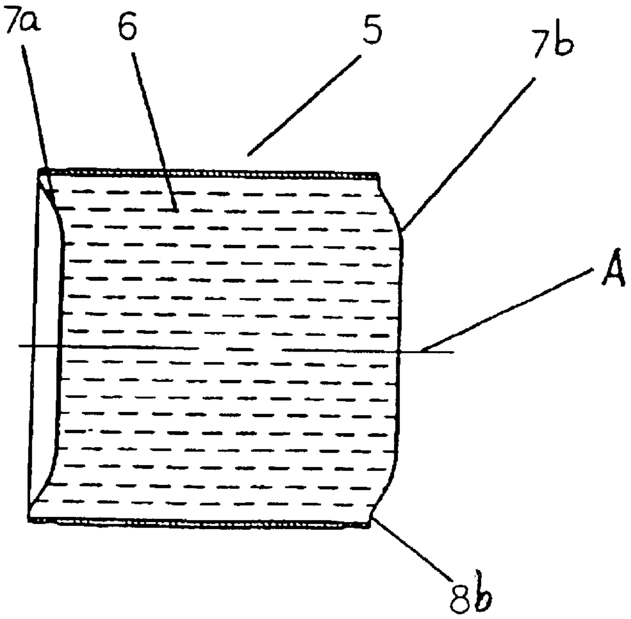
FIG. 2 is a schematic cross-sectional view of an extinguisher cartridge having a planar center of the diaphragm.

In order to prevent such an occurrence, the present invention provides forming the rupture diaphragms in a manner illustrated in FIG. 2. In this case, the center of rupture diaphragms 7*a* and 7*b* is in the form of a flat surface. Situated at the edge of rupture diaphragm 7*b* is the rupture joint 8*b* that is impressed about the circumference. Temperature-dependent volume fluctuations are compensated for with the aid of the central, planar surface, by its elastic movement in the direction of main axis A of extinguisher 1. In the case of compressed-gas generator 2 being triggered, the two diaphragms 7*a* and 7*b* are simultaneously inverted, and the rupture joints 8*a* and 8*b* weakened by the inversion pull apart.

Figure 3:
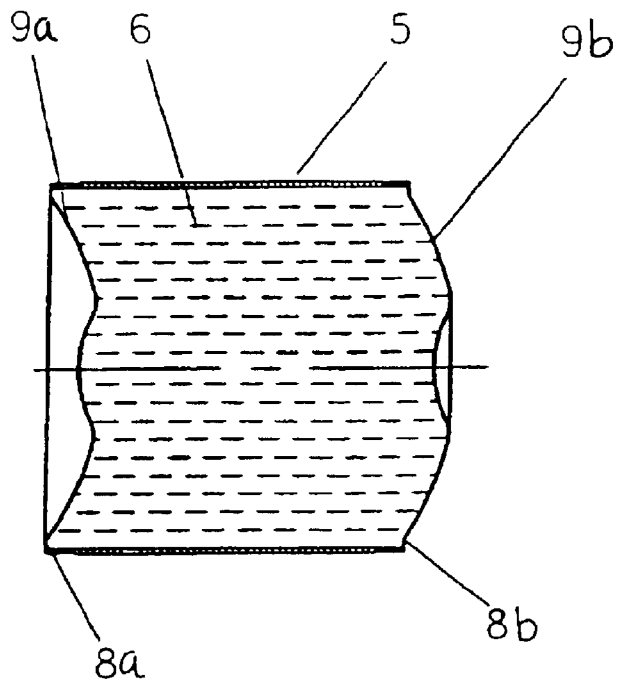
FIG. 3 is a schematic cross-sectional view of an extinguisher cartridge having a central depression.

As illustrated in FIG. 3, rupture diaphragms 9*a* and 9*b* are configured to be convex in their central region, i.e., curved away from the compressed-gas generator. This shape of the diaphragms has a positive effect in centrally focusing the pressure applied by gas generator 2.

Figure 4:
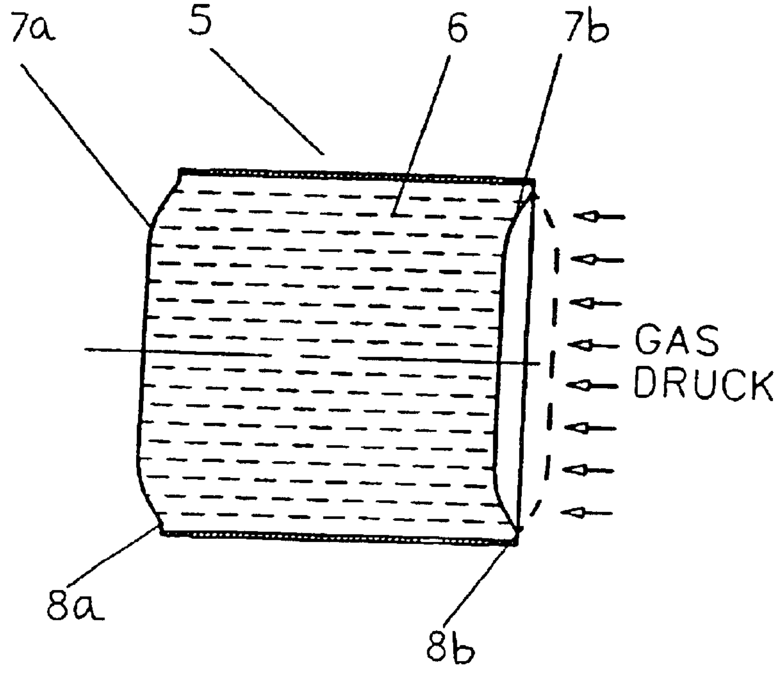
FIG. 4 is a schematic view of an inverted rupture diaphragm.

FIG. 4 illustrate the procedure of inverting the two rupture diaphragms 7*a* and 7*b* illustrated in the resting state in FIG. 2, by the action of the applied gas pressure (arrows). During the inversion procedure, rupture joints 8*a* and 8*b* are first subjected to lateral flexure and then tensile stress. The rupture simultaneously occurs along the rupture line of the two rupture joints 8*a* and 8*b*. The resting position of right rupture diaphragm 7*b* is indicated in FIG. 4 by a dashed line.

What is claimed is:

1. An extinguisher for fighting fire and incipient explosions, comprising:

a device configured to generate compressed gas;

an extinguishing-agent vessel; and at least one rupture diaphragm sealing the extinguishing-agent vessel and including a rupture joint, the rupture diaphragm curved in a direction of the device configured to generate compressed gas, the diaphragm including one of a central, planar surface and a depression curved away from the device configured to generate compressed gas;

wherein the central, planar surface includes a circular boundary.

2. The extinguisher according to claim 1, wherein the rupture joint is embodied circumferentially.

3. An extinguisher for fighting fire and incipient explosions, comprising:

a device configured to generate compressed gas;

an extinguishing-agent vessel; and at least one rupture diaphragm sealing the extinguishing-agent vessel and including a rupture joint, the rupture diaphragm curved in a direction of the device configured to generate compressed gas, the diaphragm including one of a central, planar surface and a depression curved away from the device configured to generate compressed gas;

wherein the rupture joint is embodied circumferentially at an edge of the at least one rupture diaphragm;

wherein the central, planar surface includes a circular boundary.

* * * * *